(12) United States Patent
Zhang et al.

(10) Patent No.: US 10,911,629 B2
(45) Date of Patent: Feb. 2, 2021

(54) CONTACT IMAGE SENSOR AND IMAGE SCANNING DEVICE

(71) Applicant: WEIHAI HUALING OPTO-ELECTRONICS CO., LTD., Shandong (CN)

(72) Inventors: Wenbo Zhang, Shandong (CN); Huyan Wang, Shandong (CN)

(73) Assignee: WEIHAI HUALING OPTO-ELECTRONICS CO., LTD., Shandong (CN)

( * ) Notice: Subject to any disclaimer, the term of this patent is extended or adjusted under 35 U.S.C. 154(b) by 107 days.

(21) Appl. No.: 16/099,442

(22) PCT Filed: Feb. 10, 2017

(86) PCT No.: PCT/CN2017/073235
§ 371 (c)(1),
(2) Date: Nov. 7, 2018

(87) PCT Pub. No.: WO2017/197930
PCT Pub. Date: Nov. 23, 2017

(65) Prior Publication Data
US 2019/0149686 A1    May 16, 2019

(30) Foreign Application Priority Data
May 18, 2016 (CN) .......................... 2016 1 0330199

(51) Int. Cl.
*H04N 1/393* (2006.01)
*H04N 1/031* (2006.01)
(Continued)

(52) U.S. Cl.
CPC .............. *H04N 1/031* (2013.01); *H04N 1/04* (2013.01); *H04N 1/387* (2013.01); *H04N 1/3877* (2013.01); *H04N 1/3935* (2013.01)

(58) Field of Classification Search
CPC ... H04N 1/191; H04N 1/1918; H04N 1/19515
See application file for complete search history.

(56) References Cited

U.S. PATENT DOCUMENTS 6,288,779 B1    9/2001  Smith
2005/0018279 A1   1/2005  Johnson
(Continued)

FOREIGN PATENT DOCUMENTS

CN         2559995 Y     7/2003
CN       201060321 Y     5/2008
(Continued)

*Primary Examiner* — Thanh Luu
(74) *Attorney, Agent, or Firm* — Gang Yu

(57) ABSTRACT

Some embodiments of the present disclosure provide a Contact Image Sensor (CIS), including a light source, a lens, a light-sensing portion receiving light converged by the lens, a sensor substrate carrying photosensitive Integrated Circuits (IC) arranged linearly, a frame accommodating the lens and the sensor substrate, and a light-transmitting plate provided on an upper part of the frame and configured to carry an original pattern. The CIS further includes a linear magnifying lens, provided between the light-transmitting plate and the lens, the linear magnifying lens having a characteristic of linearly magnifying an object in a single direction. The CIS involved in some embodiments of the present disclosure is capable of enhancing resolution in a single direction.

9 Claims, 4 Drawing Sheets

(51) Int. Cl.
*H04N 1/04* (2006.01)
*H04N 1/387* (2006.01)

(56) References Cited

U.S. PATENT DOCUMENTS

2009/0237748 A1* 9/2009 Yabuta ................ H04N 1/1017
358/474
2013/0038915 A1* 2/2013 Kusaka ................ G02B 13/26
358/474

FOREIGN PATENT DOCUMENTS

| | | |
|---|---|---|
| CN | 102984424 A | 3/2013 |
| CN | 204856523 U | 12/2015 |
| CN | 105872292 A | 8/2016 |
| CN | 205647681 U | 10/2016 |
| JP | S62142461 A | 6/1987 |
| JP | H11164093 A | 6/1999 |
| JP | 2009206842 A | 9/2009 |

* cited by examiner

CONTACT IMAGE SENSOR AND IMAGE SCANNING DEVICE

TECHNICAL FIELD

The present disclosure relates to a field of Contact Image Sensors (CIS), and more particularly to a CIS and an image scanning device, capable of enhancing scanning resolution by utilizing a linear magnifying lens.

BACKGROUND

With the popularization of computerized office, a scanning device is more and more widely applied. The scanning device can be utilized to scan a picture, a file and the like, and then the picture, the file and the like can be input to a computer to be post-edited or stored. Scanning resolution is an important index of the scanning device. If the resolution is too low, a scanned image may not meet demands of post-processing.

However, the scanning precision of a related scanning device mainly depends on the precision of an optical component. For example, the resolution of a Contact Image Sensor (CIS) depends on the resolution of a photosensitive chip (IC). Illustrated with an IC of 600 DPI, a size of a photosensitive window is about 40 μm. That is to say, the minimum size of a scanned pixel is 40 μm. To enhance the scanning resolution, a method for enhancing the resolution of the photosensitive chip can be utilized. As the resolution of the photosensitive chip is higher, the cost is higher accordingly, and the resolution of the photosensitive chip cannot be enhanced limitlessly.

In order to enhance the scanning resolution of the scanning device, some methods have been disclosed in the related art. For example, a magnifying lens is placed between a scanned object and a scanning module. An image magnified entirely is scanned by utilizing a scanning module, so as to increase the scanning resolution. However, this method is disadvantageous in that the size of the whole scanning device is enlarged. For example, if a magnifying factor of the magnifying lens is 5, an image plane of which the minimum size is 500 mm and a scanning module of which the minimum length is 500 mm are needed in order to scan an object that is 100 mm long. This not only increases the size of the scanning device, but also will increase the cost.

SUMMARY

In order to solve the problem in the related art, some embodiments of the present disclosure provide a CIS and an image scanning device, in order to enhance scanning resolution.

To this end, according to an aspect of some embodiments of the present disclosure, a CIS is provided, which includes a light source, a lens, a light-sensing portion receiving light converged by the lens, a sensor substrate carrying photosensitive Integrated Circuits (IC) arranged linearly, a frame accommodating the lens and the sensor substrate, and a light-transmitting plate provided on an upper part of the frame and used for carrying an original pattern. The CIS further includes a linear magnifying lens, wherein the linear magnifying lens is arranged between the light-transmitting plate and the lens, and the linear magnifying lens has a characteristic of linearly magnifying an object in a single direction.

In an exemplary embodiment, the linear magnifying lens adopts a linear Fresnel magnifying lens.

The embodiment of the present disclosure has a beneficial effect that the CIS can enhance resolution in a single direction.

According to another aspect of some embodiments of the present disclosure, an image scanning device including the CIS is provided. The image scanning device includes two CISs. The first CIS is parallel with an X direction of the image scanning device, and the second CIS is parallel with a Y direction of the image scanning device. The first CIS is pulled by a first pulling mechanism, and the second CIS is pulled by a second pulling mechanism. The image scanning device further includes a control system, a post-processing system and an original pattern table, wherein the control system is configured to control normal working of the first CIS and the second CIS, and configured to control actions of the first pulling mechanism and the second pulling mechanism; and the post-processing system is configured to process signals transmitted by the first CIS and the second CIS, and the original pattern table is configured to place an original pattern.

The embodiment of the present disclosure has a beneficial effect that the image scanning device having the CIS involved in the present disclosure can realize high-resolution scanning.

Some embodiments of the present disclosure also provide an image scanning device containing the CIS. The image scanning device includes a CIS, wherein the CIS is parallel with an X direction of the image scanning device and pulled by a pulling mechanism. The image scanning device further includes a rotating device, a control system, a post-processing system and an original pattern table, wherein the rotating device is configured to rotate the CIS for 90°; the control system is configured to control normal working of the CIS, and configured to control an action of the pulling mechanism; and the post-processing system is configured to process a signal transmitted by the CIS, and the original pattern table is used for placing an original pattern.

The solution of an embodiment of the present disclosure has a beneficial effect that the image scanning device having the CIS involved in the present disclosure can realize high-resolution scanning.

According to another aspect of some embodiments of the present disclosure, a CIS is provided. The CIS includes: a frame; a light-transmitting plate, provided on an upper part of the frame; a lens, the frame accommodating the lens; and a photosensitive assembly, provided below the lens. The CIS further includes: a linear magnifying lens, provided between the light-transmitting plate and the lens, the linear magnifying lens having a characteristic of linearly magnifying an object in a single direction.

In an exemplary embodiment, the photosensitive assembly includes: a light-sensing portion, the light-sensing portion being configured to receive light converged by the lens; and a sensor substrate, the frame accommodating the sensor substrate, the sensor substrate being configured to carry photosensitive ICs arranged linearly.

In an exemplary embodiment, the linear magnifying lens adopts a linear Fresnel magnifying lens.

According to a further aspect of some embodiments of the present disclosure, an image scanning device is provided. The image scanning device includes: a CIS, the CIS being the CIS provided above; a pulling mechanism, configured to drive the CIS to move; and a control system, configured to control actions of the pulling mechanism and the CIS respectively.

In an exemplary embodiment, the image scanning device further includes: a post-processing system, configured to process a signal transmitted by the CIS.

In an exemplary embodiment, the image scanning device further includes: an original pattern table, the original pattern table being used for placing an original pattern.

In an exemplary embodiment, the CIS includes a first CIS and a second CIS, wherein the first CIS is parallel with a first direction, the second CIS is parallel with a second direction, and an angle is provided between the first direction and the second direction; and the pulling mechanism includes a first pulling mechanism and a second pulling mechanism, the first pulling mechanism is configured to drive the first CIS to move, and the second pulling mechanism is configured to drive the second CIS to move.

In an exemplary embodiment, the image scanning device includes a CIS, and the image scanning device further includes a rotating device, the rotating device being configured to rotate the CIS.

Drawing marks: 1: frame; 2: light source; 3: sensor substrate; 4: light-sensing portion; 5: lens; 6: light-transmitting plate; 7: original pattern; 8: linear Fresnel magnifying lens; 11: pixel point; 12: image; 21: first pulling mechanism; 22: second pulling mechanism; 23: control system; 24: post-processing system; 25: original pattern table; 26: rotating device; u: object distance; v: image distance; X1: first CIS; and Y1: second CIS.

DETAILED DESCRIPTION OF THE EMBODIMENTS

According to some embodiments of the present disclosure, a CIS is provided. The CIS includes a frame, a light-transmitting plate, a lens, a photosensitive assembly and a linear magnifying lens, wherein the light-transmitting plate is provided on an upper part of the frame; the frame accommodates the lens; the photosensitive assembly is provided below the lens; and the linear magnifying lens is provided between the light-transmitting plate and the lens, and the linear magnifying lens has a characteristic of linearly magnifying an object in a single direction.

In an exemplary embodiment, the photosensitive assembly includes a light-sensing portion and a sensor substrate, wherein the light-sensing portion is configured to receive light converged by the lens, the frame accommodates the sensor substrate, and the sensor substrate is configured to carry photosensitive integrated circuits arranged linearly.

In an exemplary embodiment, the linear magnifying lens adopts a linear Fresnel magnifying lens.

According to some embodiments of the present disclosure, an image scanning device is provided. The image scanning device includes a CIS, a pulling mechanism and a control system, wherein the CIS is the CIS provided above; the pulling mechanism is configured to drive the CIS to move; and the control system is configured to control actions of the pulling mechanism and the CIS respectively.

In an exemplary embodiment, the image scanning device further includes a post-processing system, configured to process a signal transmitted by the contact image sensor (CIS).

In an exemplary embodiment, the image scanning device further includes an original pattern table, the original pattern table being configured to place an original pattern.

Figure 3:
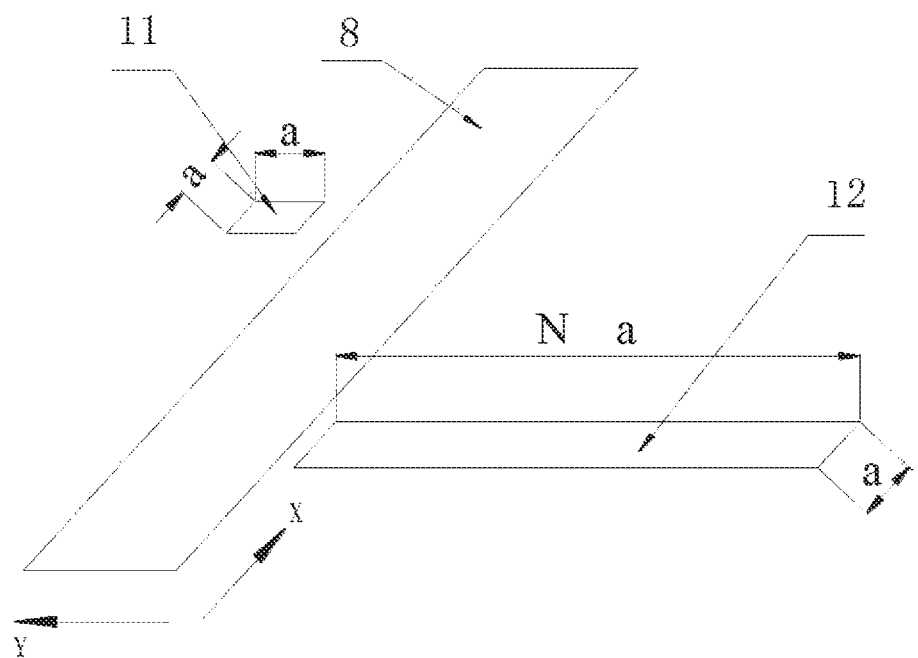
FIG. 3 shows a magnifying principle diagram of a linear Fresnel magnifying lens involved in an embodiment of the present disclosure.

In an exemplary embodiment, the contact image sensor (CIS) includes a first contact image sensor (CIS) and a second contact image sensor (CIS), wherein the first contact image sensor (CIS) is parallel with a first direction, the second contact image sensor (CIS) is parallel with a second direction, and an angle is provided between the first direction and the second direction; and the pulling mechanism includes a first pulling mechanism and a second pulling mechanism, the first pulling mechanism is configured to drive the first contact image sensor (CIS) to move, and the second pulling mechanism is configured to drive the second contact image sensor (CIS) to move. Specifically, as a first specific embodiment of the present disclosure, as shown in FIG. 3, the first direction is an X direction, and a second direction is a Y direction.

In an exemplary embodiment, the image scanning device includes one CIS, and the image scanning device further includes a rotating device, the rotating device being configured to rotate the contact image sensor (CIS).

The embodiments of the present disclosure will be further described herein below in conjunction with the drawings.

Figure 1:
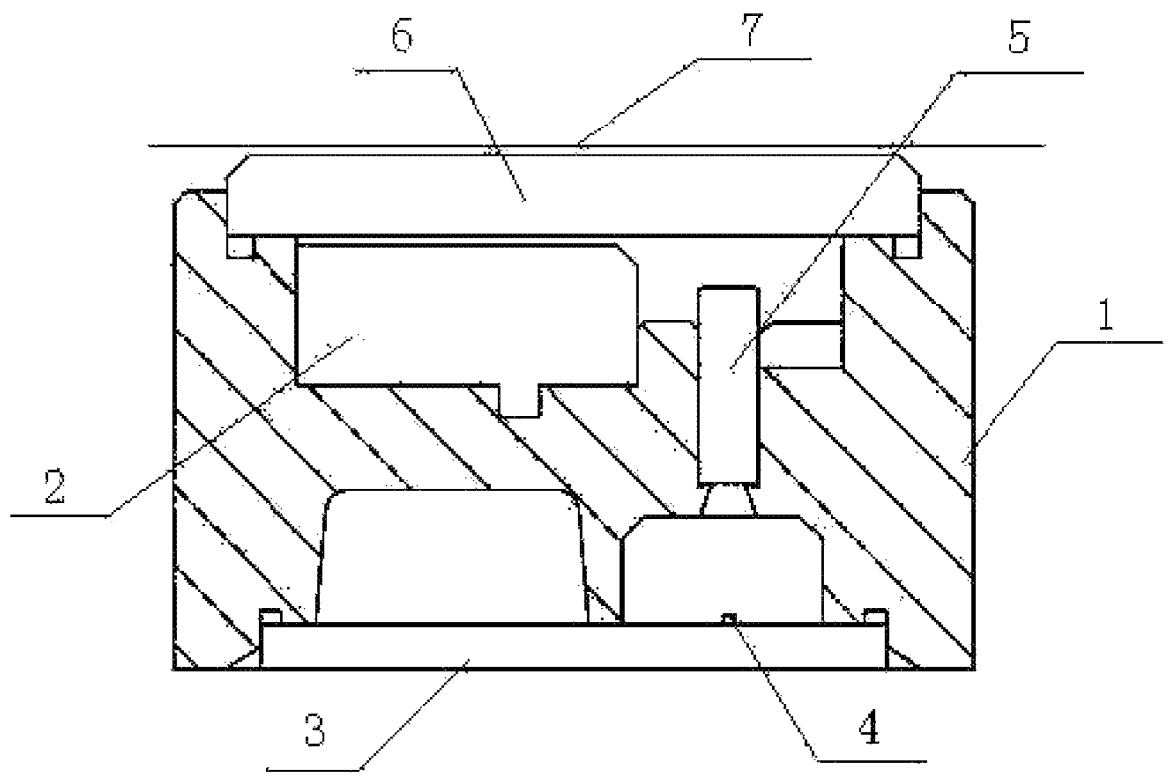
FIG. 1 shows a section view of a CIS in the related art.

As shown in FIG. 1, a CIS in the related art includes a light source 2, a lens 5, a light-sensing portion 4 (namely photosensitive integrated circuit IC) receiving light converged by the lens 5, a sensor substrate 3 carrying photosensitive ICs arranged linearly, a frame 1 accommodating the lens 5 and the sensor substrate 3, and a light-transmitting plate 6 provided on an upper part of the frame 1 and configured to carry an original pattern 7.

Figure 2A:
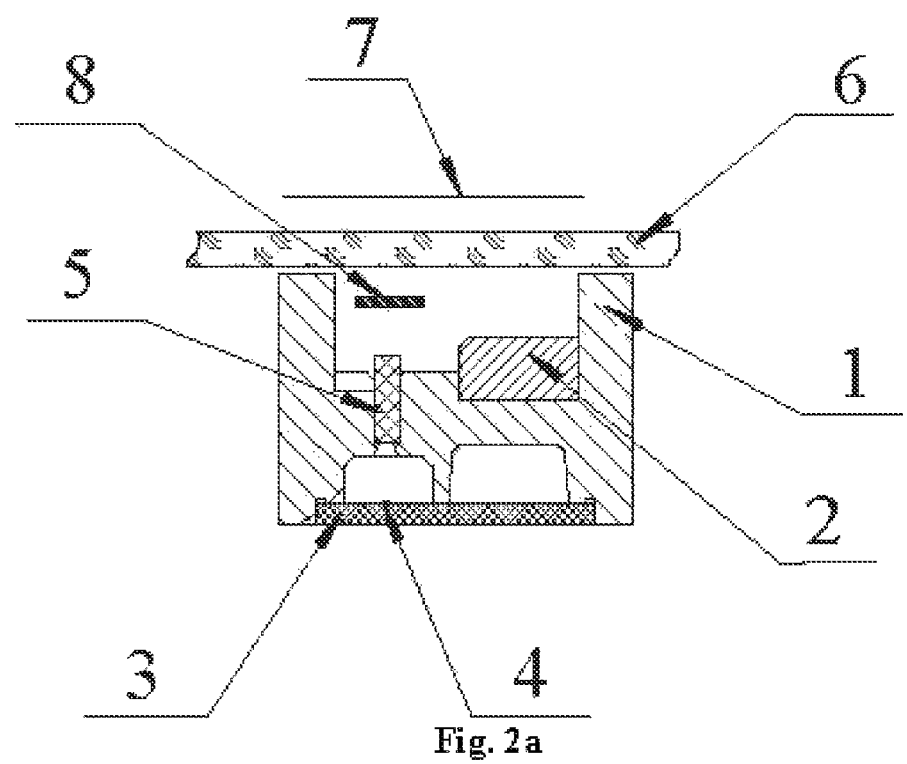
FIG. 2a shows a section view of a CIS involved in an embodiment of the present disclosure.
Figure 2B:
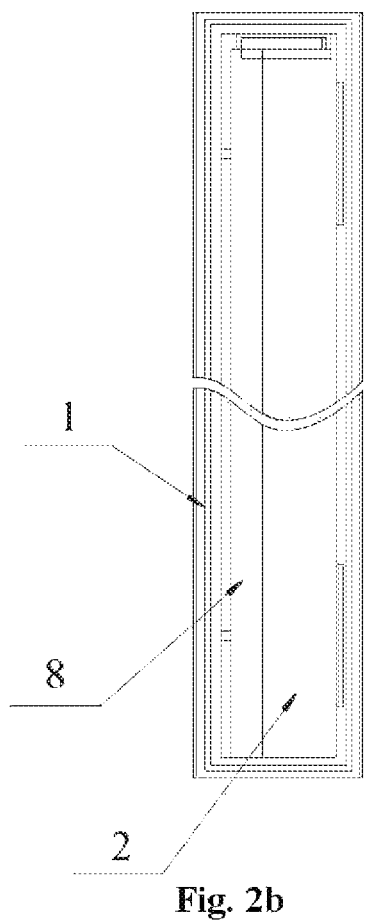
FIG. 2b shows a top view of a CIS involved in an embodiment of the present disclosure.

The section view of a CIS involved in an embodiment of the present disclosure is as shown in FIG. 2a, and the top view thereof is as shown in FIG. 2b. From the figures, it can be seen that the CIS involved in an embodiment of the present disclosure includes a light source 2, a lens 5, a light-sensing portion 4 (namely photosensitive integrated circuit IC) receiving light converged by the lens 5, a sensor substrate 3 carrying photosensitive ICs arranged linearly, a frame 1 accommodating the lens 5 and the sensor substrate 3, and a light-transmitting plate 6 provided on an upper part of the frame 1 and configured to carry an original pattern 7. All of the above components are identical to those in the related art in structure and working principle, which will not be elaborated herein. The CIS involved in some embodiments of the present disclosure further includes a linear Fresnel magnifying lens 8, wherein the linear Fresnel magnifying lens 8 is provided between the light-transmitting plate 6 and the lens 5.

The linear Fresnel magnifying lens 8 is a lens capable of linearly magnifying an object in a single direction. A magnifying factor of the conventional linear Fresnel magnifying lens 8 may reach about 5 times. FIG. 3 shows a magnifying principle diagram of a linear Fresnel magnifying lens involved in an embodiment of the present disclosure. A pixel point 11 is taken as an example. The pixel point 11 is a pixel point having a length of a in both the X direction and the Y direction, the magnifying factor of the linear Fresnel magnifying lens 8 is N times, and according to the principle of the linear Fresnel magnifying lens 8, it can be seen that the length a of an image magnified by the linear Fresnel magnifying lens 8 remains unchanged in the X direction and the length in the Y direction will be N times of the original length. That is to say, the length of the image 12 formed by magnifying the pixel point 11 via the linear Fresnel magnifying lens 8 in the X direction is a, and the length in the Y direction is Na. Thus, light emitted from the light source 2 is emitted to the original pattern 7, and light reflected by the original pattern 7 enters the linear Fresnel magnifying lens 8, is magnified to be N times larger in the Y direction by the linear Fresnel magnifying lens 8, enters the lens 5, and then is converged on the light-sensing portion 4. Other subsequent processes are basically the same as those in the related art, and will not be elaborated herein.

Figure 4:
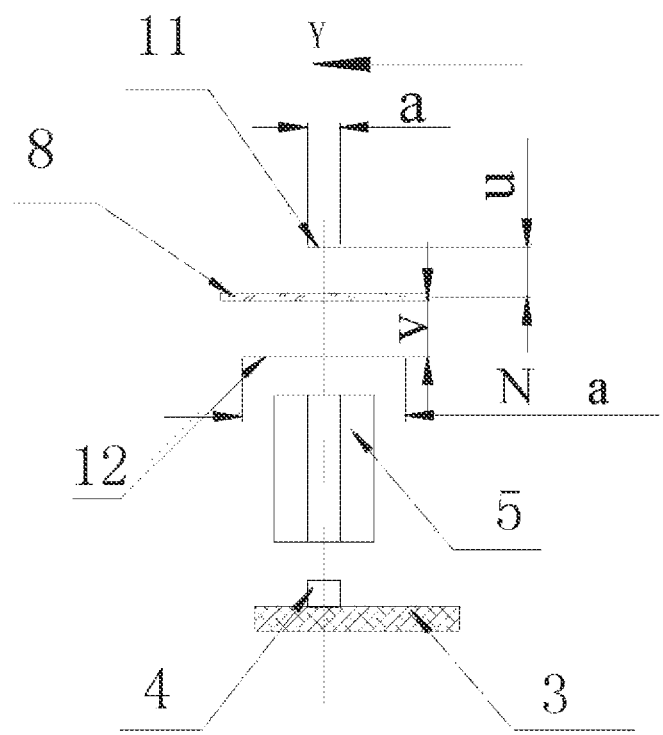
FIG. 4 shows a principle diagram of enhancing resolution via a CIS involved in an embodiment of the present disclosure.

FIG. 4 shows a principle diagram of enhancing resolution via a CIS involved in an embodiment of the present disclosure. The linear Fresnel magnifying lens 8 is put above the lens 5 of the CIS. The distance between the linear Fresnel magnifying lens 8 and the pixel point 11 is an object distance u, the distance between the linear Fresnel magnifying lens 8 and the image 12 is an image distance v, and the position of the linear Fresnel magnifying lens 8 is properly adjusted, such that the image 12 magnified by the linear Fresnel magnifying lens 8 is located at a focal point of the lens 5, and therefore the image 12 will be converged to the light-sensing portion 4 by the lens 5. Certainly, the lens 5 can converge the image 12 of which the length is a each time, the original pattern 7 moves in the Y direction for a distance of a/N each time, and after the original pattern moves for N times, a pixel point 11 of which the length is a is magnified by the linear Fresnel magnifying lens 8 and can be divided, in the Y direction, into N parts to be scanned. Thus, resolution in the Y direction can be enhanced by N times, and therefore the novel Contact Image Sensor (CIS) can be utilized to enhance resolution in a single direction.

An image scanning device having the novel CIS can enhance resolution in the X and Y directions, i.e., can enhance the resolution of the whole scanned image. Specific embodiments are adopted for description herein below.

Embodiment 1

Figure 5:
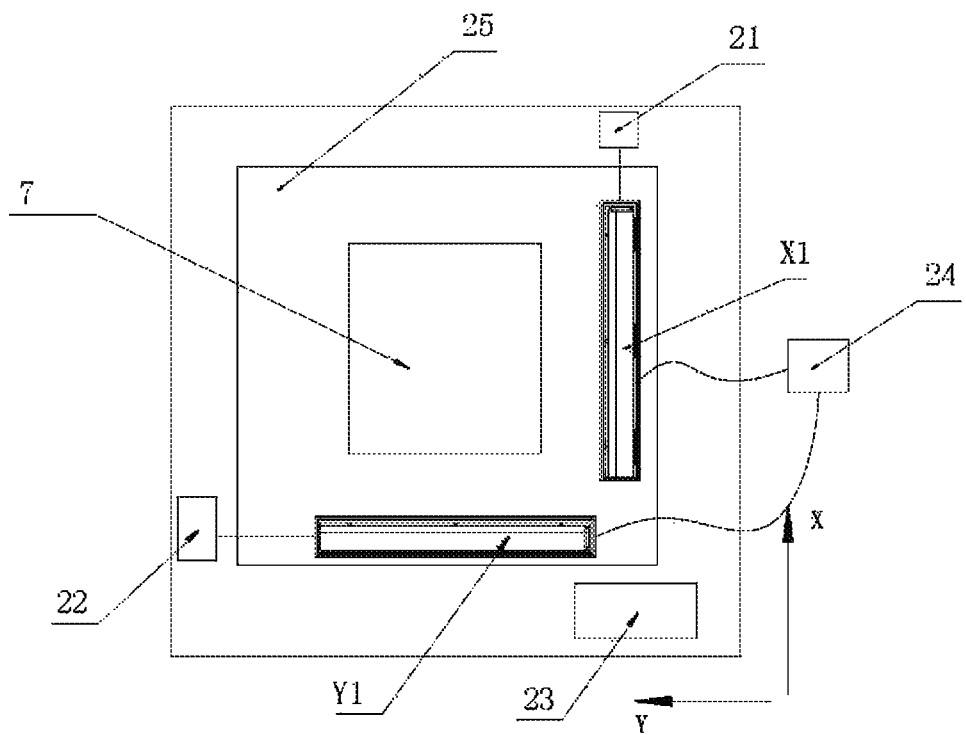
FIG. 5 shows a structure diagram of an image scanning device as shown in Embodiment 1.

FIG. 5 shows a structure diagram of an image scanning device as shown in Embodiment 1. The main difference between the image scanning device and a conventional image scanning device lies in that: the image scanning device includes two contact image sensors involved in some embodiments of the present disclosure namely a first CIS X1 and a second CIS Y1. The first CIS X1 is parallel with an X direction of the image scanning device, and the second CIS Y1 is parallel with a Y direction of the image scanning device. The first CIS X1 is pulled by a first pulling mechanism 21, and the second CIS Y1 is pulled by a second pulling mechanism 22. The image scanning device further includes a control system 23, a post-processing system 24 and an original pattern table 25. The control system 23 is mainly configured to control normal working of the first CIS X1 and the second CIS Y1, and configured to control actions of the first pulling mechanism 21 and the second pulling mechanism 22. The post-processing system 24 is configured to subsequently process signals transmitted by the first CIS X1 and the second CIS Y1.

The working principle of the image scanning device is as follows. Firstly, an object to be scanned (original pattern 7) is put on the original pattern table 25, light emitted from a light source 2 is irradiated to the original pattern 7 through the original pattern table 25, light reflected by the original pattern 7 enters a linear Fresnel magnifying lens 8 via the original pattern table 25, is magnified, enters a lens 5, and then is converged to a light-sensing portion 4 by the lens 5, and these light signals are converted into electric signals to be output to the post-processing system 24 for subsequent processing. Under the control of the control system 23, the first pulling mechanism 21 pulls the first CIS X1 to move forward in the Y direction at a step of a/N, every time the first CIS X1 moves forward for N steps, a row of pixel points of the original pattern 7 can be scanned, and the light-sensing portion 4 collects N rows of pixel points. Therefore, compared with the related image scanning device, this image scanning device enhances scanning resolution by N times in the Y direction. After scanning is completed, a group of data in the Y direction can be obtained. Likewise, the second pulling mechanism 22 is utilized to pull the second CIS Y1 to perform scanning in the X direction, and a group of data in the X direction can be obtained. The two groups of data are combined into a complete image via the post-processing system 24, a complete image of which the resolution is enhanced by N times can be obtained, and high-resolution scanning is realized.

Embodiment 2

Figure 6:
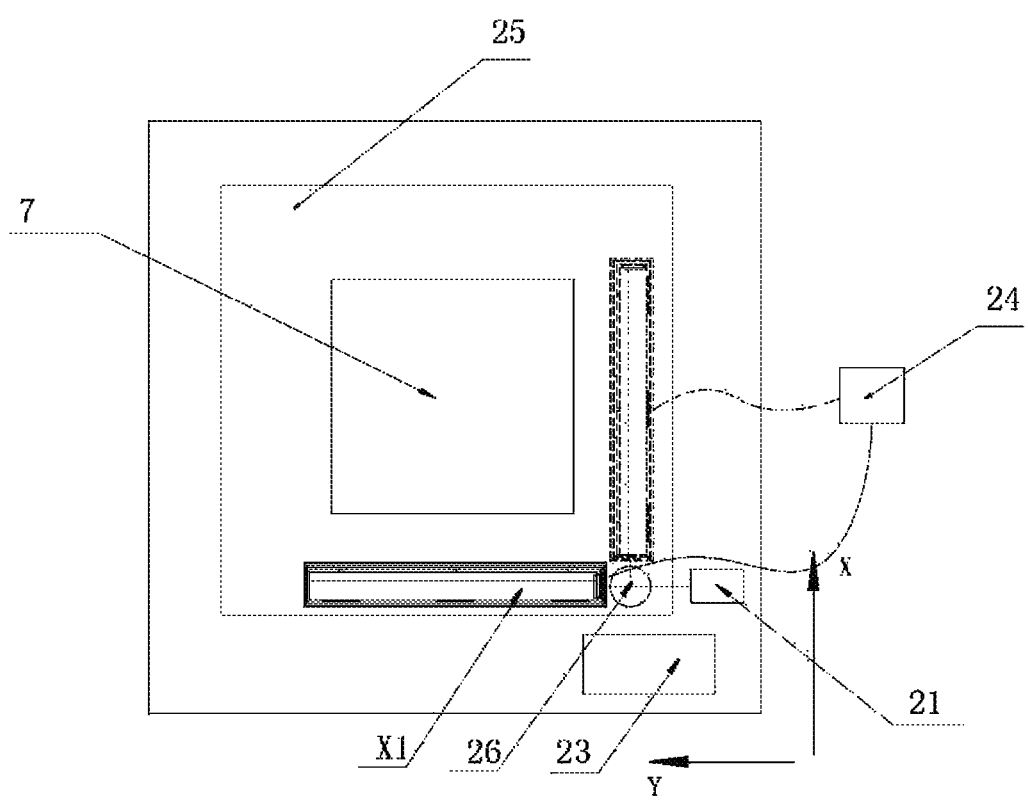
FIG. 6 shows a structure diagram of an image scanning device as shown in Embodiment 2.

FIG. 6 shows a structure diagram of an image scanning device as shown in Embodiment 2. The difference between the present embodiment and Embodiment 1 lies in that the image scanning device adopts one novel CIS involved in an embodiment of the present disclosure such as a first CIS X1 and is added with a rotating device 26. The working principle thereof is as follows. Under the control of the control system 23, the first pulling mechanism 21 pulls the first CIS X1 to move forward in the Y direction at a step of a/N, so that a group of data in the Y direction is obtained. When the first CIS X1 completes scanning in the Y direction, under an action of the rotating device 26, the first CIS X1 is rotated for 90° and is parallel with the Y direction, under the control of the control system 23, the first pulling mechanism 21 pulls the first CIS X1 to perform scanning in the X direction, and a group of data in the X direction can be obtained. Similar to Embodiment 1, by means of subsequent processing via the post-processing system 24, a complete image of which the resolution is enhanced by N times can be obtained, and high-resolution scanning is realized.

The CIS involved in an embodiment of the present disclosure can enhance resolution in a single direction. The image scanning device having the CIS involved in the present disclosure can realize high-resolution scanning.

What is claimed is:

1. An image scanning device comprising two contact image sensors, the first contact image sensor being parallel with an X direction of the image scanning device, the second contact image sensor being parallel with a Y direction of the image scanning device, the first contact image sensor being pulled by a first pulling mechanism, the second contact image sensor being pulled by a second pulling mechanism, the image scanning device further comprising a control system, a post-processing system and an original pattern table, wherein the control system is configured to control normal working of the first contact image sensor and the second contact image sensor, and configured to control actions of the first pulling mechanism and the second pulling mechanism; and the post-processing system is configured to process signals transmitted by the first contact image sensor and the second contact image sensor, and the original pattern table is configured to place an original pattern, wherein each of the two contact image sensors comprises a light source, a lens, a light-sensing portion receiving light converged by the lens, a sensor substrate carrying photosensitive Integrated Circuits (IC) arranged linearly, a frame accommodating the lens and the sensor substrate, and a light-transmitting plate provided on an upper part of the frame and configured to carry an original pattern, wherein the contact image sensor further comprises a linear magnifying lens, the linear magnifying lens being provided between the light-transmitting plate and the lens, and the linear magnifying lens having a characteristic of linearly magnifying an object in a single direction.

2. The image scanning device as claimed in claim 1, wherein the linear magnifying lens adopts a linear Fresnel magnifying lens.

3. An image scanning device comprising a contact image sensor, the contact image sensor being parallel with an X direction of the image scanning device and pulled by a pulling mechanism, wherein the image scanning device moves along an Y direction, the image scanning device further comprising a rotating device, a control system, a post-processing system and an original pattern table, wherein the rotating device is configured to rotate the contact image sensor for 90°, the image scanning device moves along the X direction; the control system is configured to control normal working of the contact image sensor, and configured to control an action of the pulling mechanism; and the post-processing system is configured to process a signal transmitted by the contact image sensor, and the original pattern table is used for placing an original pattern; wherein the contact image sensor comprises a light source, a lens, a light-sensing portion receiving light converged by the lens, a sensor substrate carrying photosensitive Integrated Circuits (IC) arranged linearly, a frame accommodating the lens and the sensor substrate, and a light-transmitting plate provided on an upper part of the frame and configured to carry an original pattern, wherein the contact image sensor further comprises a linear magnifying lens, the linear magnifying lens being provided between the light-transmitting plate and the lens, and the linear magnifying lens having a characteristic of linearly magnifying an object in a single direction.

4. An image scanning device, comprising:
a contact image sensor;
a pulling mechanism, configured to drive the contact image sensor to move; and
a control system, configured to control actions of the pulling mechanism and the contact image sensor respectively; the contact image sensor comprises:
a frame;
a light-transmitting plate, provided on an upper part of the frame;
a lens, the frame accommodating the lens; and
a photosensitive assembly, provided below the lens,
wherein the contact image sensor further comprises:
a linear magnifying lens, provided between the light-transmitting plate and the lens, the linear magnifying lens having a characteristic of linearly magnifying an object in a single direction;
wherein the contact image sensor comprises a first contact image sensor and a second contact image sensor, the first contact image sensor is parallel with a first direction, the second contact image sensor is parallel with a second direction, and an angle is provided between the first direction and the second direction; and the pulling mechanism comprises a first pulling mechanism and a second pulling mechanism, the first pulling mechanism is configured to drive the first contact image sensor to move, and the second pulling mechanism is configured to drive the second contact image sensor to move.

5. The image scanning device as claimed in claim 4, wherein the photosensitive assembly comprises:
a light-sensing portion, the light-sensing portion being configured to receive light converged by the lens; and
a sensor substrate, the frame accommodating the sensor substrate, the sensor substrate being configured to carry photosensitive Integrated Circuits (IC) arranged linearly.

6. The image scanning device as claimed in claim 4, wherein the linear magnifying lens adopts a linear Fresnel magnifying lens.

7. The image scanning device as claimed in claim 4, further comprising:
a post-processing system, configured to process a signal transmitted by the contact image sensor.

8. The image scanning device as claimed in claim 7, further comprising:
an original pattern table, the original pattern table being used for placing an original pattern.

9. The image scanning device as claimed in claim 4, further comprising a contact image sensor, and further comprising a rotating device, the rotating device being configured to rotate the contact image sensor.

\* \* \* \* \*